No. 625,574. Patented May 23, 1899.
T. R. LOCKE.
BICYCLE ATTACHMENT.
(Application filed May 5, 1897.)
(No Model.)
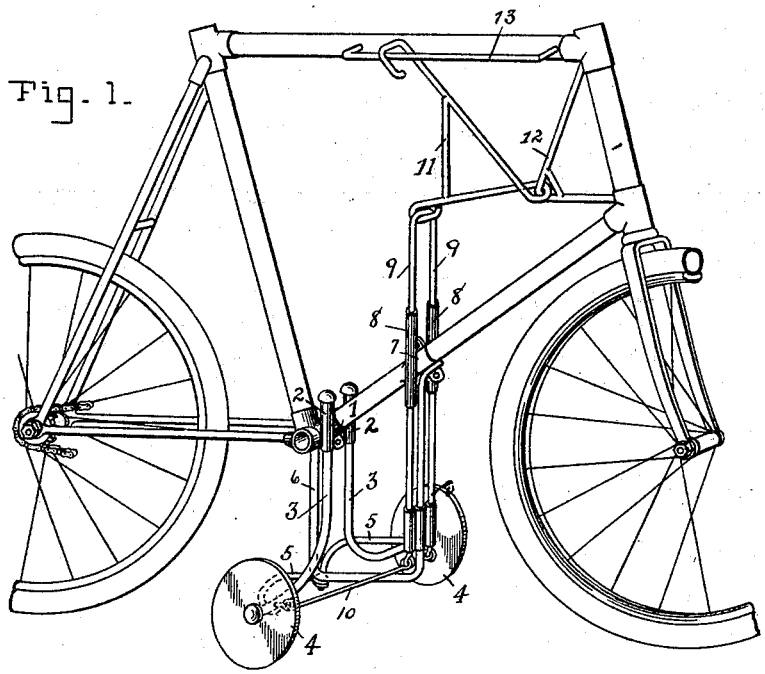
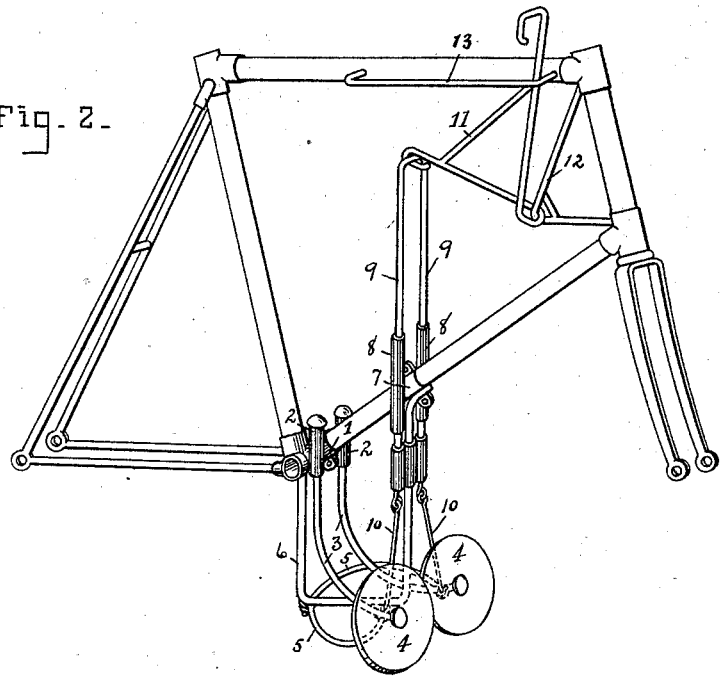
Witnesses
Lee J. Van Horn
Victor J. Evans
Inventor
Thomas. R. Locke,
By John Wedderburn. Attorney
THE NORRIS PETERS CO., PHOTO-LITHO., WASHINGTON, D. C.

UNITED STATES PATENT OFFICE.

THOMAS R. LOCKE, OF MONTE VISTA, COLORADO, ASSIGNOR OF ONE-THIRD TO SELDEN M. FRENCH, OF SAME PLACE.

BICYCLE ATTACHMENT.

SPECIFICATION forming part of Letters Patent No. 625,574, dated May 23, 1899.

Application filed May 5, 1897. Serial No. 635,180. (No model.)

*To all whom it may concern:*

Be it known that I, THOMAS R. LOCKE, of Monte Vista, in the county of Rio Grande and State of Colorado, have invented certain new and useful Improvements in Bicycle Attachments; and I do hereby declare the following to be a full, clear, and exact description of the invention, such as will enable others skilled in the art to which it appertains to make and use the same.

This invention relates to improvements in bicycle attachments; and the object of the same is to provide auxiliary supporting-wheels therefor, the same being so constructed that they may be carried by the bicycle-frame to be brought into use when desired for supporting the bicycle or for use with beginners or when it is desired to ride at an exceedingly slow pace.

The invention consists in the novel features of construction hereinafter more particularly set forth and claimed.

In the accompanying drawings, forming a part of this specification, Figure 1 is a view of my invention, showing the same in use; and Fig. 2 is a view showing the same folded when not desired for use.

Referring to the drawings, 1 indicates a double clamp, which is adapted to be secured to the frame of the wheel adjacent the crank-bearing, each member of said clamp having the vertical guides or bearing-sleeves 2 carried thereby. Rotatably secured at their upper vertically-disposed ends within these guides are the curved or crank-shaped arms 3, which curve outwardly at their lower ends into a horizontal plane and upon the extremities of which are journaled the wheels 4. These wheels are very light in construction and are provided with rubber tires similar to the ordinary wheels of bicycles, the same being also formed with ball-bearings. 5 indicates arms or braces, which are secured at the outer ends to the lower ends of said curved arms adjacent the journals of the wheels 4, the inner ends of said arms being pivoted to the under side of a depending frame 6, the upper end of one arm of this frame being secured to the clamp 1 and the upper end of the opposite arm being secured to the double clamp 7, which is attached to the lower front brace or bar of the bicycle-frame. Vertically-disposed tubular guides 8 are secured vertically to opposite sides of the clamp 7, and adapted to extend through these guides are the legs of the U-shaped rod 9, the lower ends of these legs being pivotally connected to the lower ends of the curved arms by links 10, so that when said U-shaped rod is drawn upward the wheels are moved forward to inoperative position, as illustrated in Fig. 2. For effecting the movement of this operating-rod I provide a bell-crank lever 11, which is pivotally secured at one end thereto and which is pivoted to a brace or double clamp 12, secured to the front-fork tube of the bicycle. The upper end of said lever extends through and is movable in the guide 13, supported by clamps or in any other desired manner upon the upper bar of the bicycle-frame. The extremity of the lever is formed with the handle portion, by means of which it may be conveniently operated. From the above description it will be understood that when the lever is depressed the U-shaped rod is moved downward and the wheels are unfolded to form a support for the bicycle, and upon a reverse movement of said lever the parts are folded and secured out of the way until desired again for use.

My invention is especially useful where persons are beginning to ride or for use in the army or by mail-carriers, as it enables the rider to dismount from the wheel and the same will be supported or to ride exceedingly slowly when desired.

Having thus described my invention, what I claim as new, and desire to secure by Letters Patent, is—

1. The combination with the lower front bar or brace of a bicycle, of a plurality of clamps removably secured thereto, a pendent U-shaped frame connecting said clamps, one of which is provided with upright sleeve-bearings, curved arms having their upright ends journaled in said sleeves, one on each side of said brace-bar and carrying auxiliary wheels on their lower swinging ends, vertical guide-sleeves on the other clamp, one on each side of the brace, an inverted-U-shaped rod, the arms of which slide in said guide-sleeves, links connecting the lower ends of said rod with the swinging ends of the auxiliary wheel-carrying arms, pivoted braces connecting said wheel-carrying arms with the pendent U-shaped frame, and a lever connected with the upper end of the inverted-U-shaped rod and with the machine-frame for swinging the auxiliary wheels into and out of operative position, substantially as described.

2. The combination with a bicycle, of a clamp adapted to be secured thereto, guides on opposite sides of said clamp, arms rotatably secured in said guides, and at their lower ends curved outwardly, wheels journaled upon the outer ends of said arms, a U-shaped frame, one arm of said frame being secured to said clamp, a clamp adapted to be positioned upon the frame of the wheel to which the opposite arm of the U-shaped frame is secured, said frame depending from the under side of the frame of the bicycle, rods secured at their outer ends to the lower ends of the curved arms and pivotally secured at their inner ends to the U-shaped frame, tubular guides carried by the last-named clamp, a U-shaped rod having its legs extending through said guides, links pivoted to the lower end of said rod and at their opposite ends to the curved arms, a bracket detachably secured to the upper portion of the bicycle-frame, a bell-crank lever pivoted thereto and pivotally secured to the U-shaped rod, a guide upon the frame in which said lever is movable, and means for securing said lever in a raised or lowered position, substantially as described.

In testimony whereof I have signed this specification in the presence of two subscribing witnesses.

THOMAS R. LOCKE.

Witnesses:
W. T. BRYANT,
RUFUS PUTNAM.